United States Patent Office 3,346,075
Patented Oct. 10, 1967

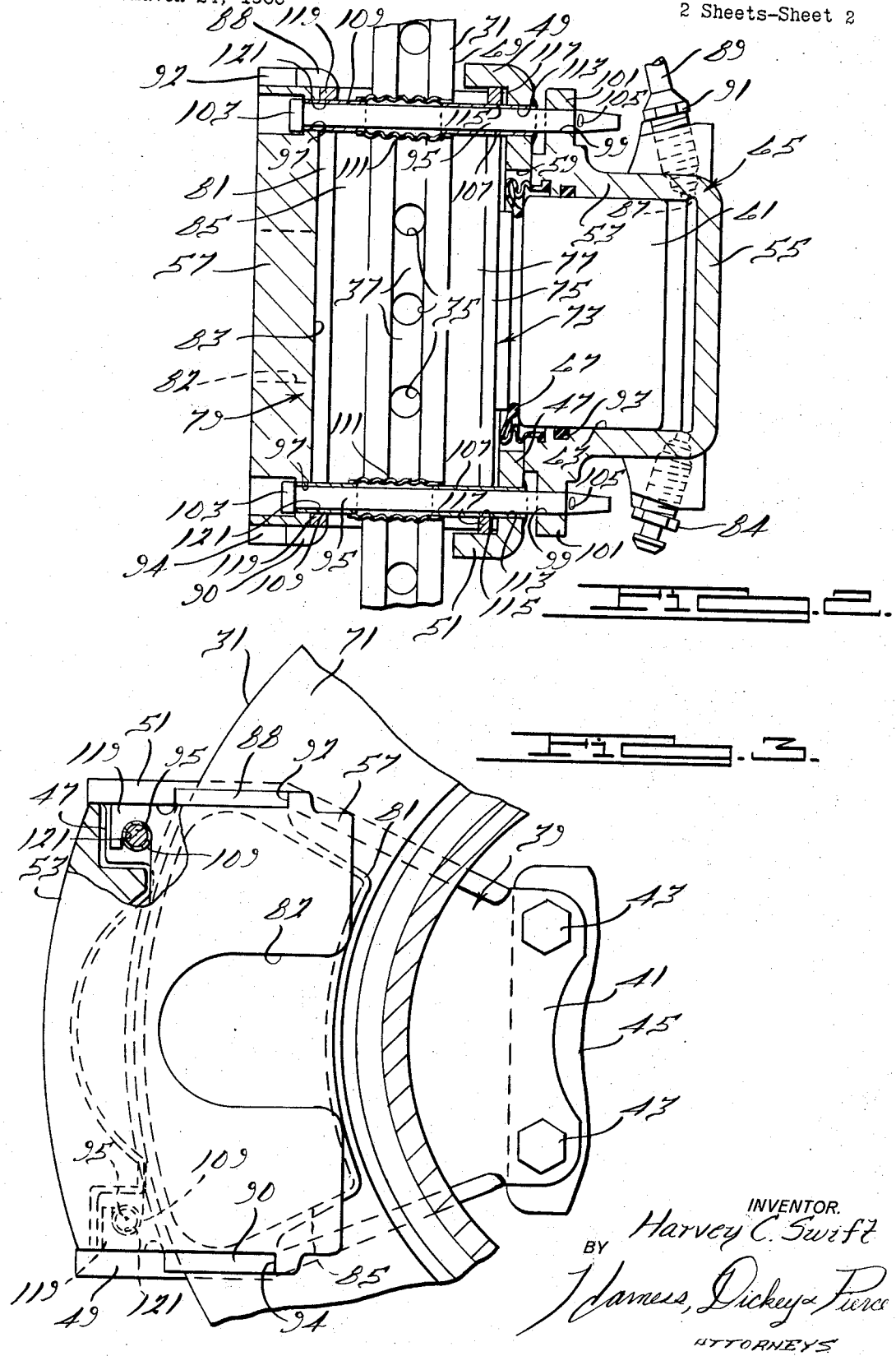

3,346,075
GUIDE MEANS FOR A CALIPER OF A DISC BRAKE
Harvey C. Swift, Birmingham, Mich., assignor to Kelsey-Hayes Company, Romulus, Mich., a corporation of Delaware
Filed Mar. 24, 1966, Ser. No. 537,219
3 Claims. (Cl. 188—73)

ABSTRACT OF THE DISCLOSURE

A disk brake assembly of the sliding caliper type wherein at least a portion of the braking torque reaction is transmitted to a fixed torque plate. The portion of the braking torque transmitted to the torque plate is transmitted through a pair of sleeves, one of which is fixed to the torque plate and the other of which is fixed to the caliper and by means of a pin that extends through these sleeves. A flexible boot extends between the adjacent ends of the sleeves and encircles the pin to protect it from contamination.

---

This invention relates generally to brakes and particularly to an improved torque reaction construction for a vehicle disk brake.

An important object of the present invention is to provide an improved smooth operating torque reaction construction for disk brakes.

Another object of the present invention is to provide a torque reaction construction of the above character which maintains desirable operating characteristics irrespective of deposits of dirt, grease, salt, moisture, ice or other foreign matter.

Additional objects of the present invention are to provide a disk brake torque reaction construction of the above character which affords consistent and reliable brake operation and which is relatively inexpensive to manufacture, durable in construction and easy to assemble and disassemble.

Further objects and advantages of the present invention will become more apparent from a consideration of the following detailed description taken in conjunction with the drawings in which:

FIGURE 2 is a sectional view of FIG. 1 taken along the line 2—2 thereof; and

FIGURE 3 is a sectional view of FIG. 1 taken along the line 3—3 thereof.

Figure 1:
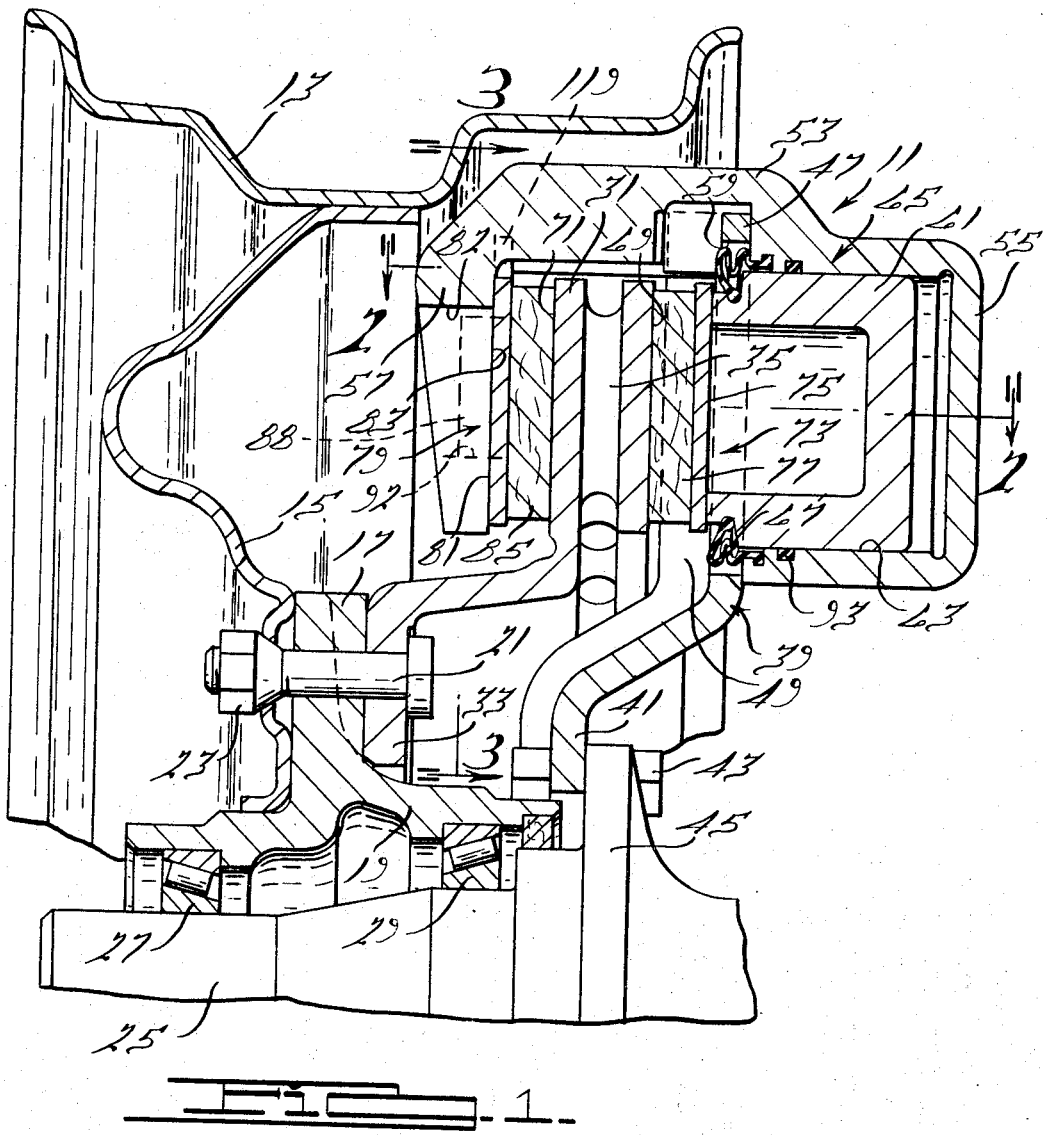
FIGURE 1 is a sectional view illustrating a portion of a vehicle wheel assembly illustrating a typical installation of the present invention.

Broadly described, the present invention includes a stationary torque member, a housing having spaced legs lying on opposite sides of a rotor that is rotatable about a central axis, said housing being movable in a generally axial direction, first brake shoe means nonrotatably carried by said housing and positioned to frictionally engage one face of said rotor, second brake shoe means nonrotatably supported relative to said torque member and adapted to frictionally engage an opposite face of said rotor, sleeve means extending substantially parallel to said rotor axis and fixed to said torque member, elongated rigid means carried by said housing and slidable within said sleeve means, said sleeve and rigid means cooperating to transfer torque on said housing to said torque member.

Referring now more specifically to the drawings, a disk brake embodying the present invention is shown generally at 11 in FIG. 1 and is seen associated with a vehicle wheel including a wheel rim 13 having a web 15 secured to a flange 17 of a rotatable hub 19 by bolts 21 and nuts 23. The hub 19 is supported upon a fixed wheel spindle 25 by spaced bearings 27, 29 in the usual manner.

A brake disk or rotor 31 is secured for rotation with the wheel rim 13 by having a laterally offset radial flange 33 secured to the hub flange 17 and the rim web 15 also by the bolts 21. A plurality of radially extending openings 35 are formed in the rotor 31 and are separated by intermediate web portions 37 which act as fan blades to convey cooling air outwardly through the openings 35 during turning movement of the rotor 31.

A torque spider 39 is seen in FIGS. 1 and 3 to have a laterally offset mounting arm 41 fixed by bolts 43 to a flange 45 integral with the fixed wheel spindle 25. The spider 39 has an outwardly extending arm 47 provided with a right angle flange 49, 51 at either side thereof. As shown in FIG. 3, the flanges 49, 51 extend outwardly beyond the arm 47 and slidably receive a housing or caliper 53 therebetween. Thus, the caliper 53 is movable parallel to the axis of the rotor 31 but is prevented from turning therewith.

The caliper 53 has spaced legs 55, 57 lying on opposite sides of the rotor 31. The leg 55 is provided with a cylinder bore 63 opening to the inner side thereof. A piston 61 is slidable within the cylinder bore 63 and extends freely through an opening 59 in the spider arm 47. The piston 61 and cylinder bore 63 together form a hydraulic motor 65 to which pressurized fluid is delivered to energize the disk brake 11 and slow or stop the vehicle wheel. A flexible boot 67 having one end fixed to the caliper leg 55 and the other end fixed to the piston 61 prevents the sliding surfaces of the hydraulic motor 65 from becoming contaminated.

The rotor 31 has a pair of radially extending, parallel braking faces 69, 71 each of which is adapted to be frictionally engaged by a brake shoe means when the hydraulic motor 65 is energized. Thus, an inboard brake shoe 73 includes a backing plate 75 positioned to engage the outer end of the piston 61 and has brake lining 77 bonded or riveted thereto in the usual manner. An outboard brake shoe 79 includes a backing plate 81 seated against a flat surface 83 on the caliper leg 57 and has a brake lining 85 also bonded or riveted thereto. The caliper leg 57 may be centrally apertured at 82 to reduce the overall weight of the device.

The hydraulic motor 65 is energized by pressurized fluid admitted to the cylinder bore 63 through a passage 87 behind the piston 61. Pressurized fluid is delivered from a master cylinder (not shown) through a conduit 89 connected to the passage 87 by a coupling 91. The fluid pressure acts upon the piston 61 to move it toward the left as seen in FIGS. 1 and 2 pressing the lining 77 of brake shoe 73 into tight frictional engagement with the rotor face 69. The reaction to this fluid pressure biases the caliper 53 toward the right as seen in the figures causing the lining 85 of brake shoe 79 to tightly engage the rotor face 71. Thus, the brake shoes 73, 79 act in concert to slow or stop the rotor 31 and the vehicle wheel associated therewith. A conventional bleed fitting 84 communicates with the cylinder bore 63 above the passage 87 for bleeding the hydraulic system.

Upon relieving the fluid pressure to the cylinder bore 63, the biasing forces on the piston 61 and caliper 53 are released as are the linings 77, 85 of brake shoes 73, 79 from the rotor faces 69, 71. If desired, an annular seal 93 carried within the cylinder bore 63 and sealingly engaging the piston 61 may have a generally rectangular cross-section so that when the hydraulic motor 65 is energized and the piston 61 moved toward the left, the seal 93 becomes distorted or twisted and springs back upon hydraulic motor deenergization to help release the linings 77, 85 from the rotor faces 69, 71.

When the brake shoes 73, 79 are applied, the frictional forces between the linings 77, 85 and the rotor faces 69, 71 develop torque tending to move each of these brake shoes in the direction the rotor 31 is turning. The torque on the inboard brake shoe 73 is taken directly by the torque spider 39 in that the backing plate 75 is confined between the right angle flanges 55, 57 on the torque arm 47. The backing plate 81 of the outboard brake shoe 79, on the other hand, has a right angle flange 88, 90 at either side thereof seated on projecting flanges 92, 94 on the caliper leg 57 and closely engaging the outer sides of this caliper leg. The torque on the brake shoe 79 is taken by the caliper 53 and is transferred to the torque spider 39 by a novel means described below.

As seen best in FIG. 2, each of a pair of elongated pins 95 extends through an opening 97 in the caliper leg 57 and an opening in flange-like projections 101 on the caliper leg 55. Each of the pins 95 has a head 103 at one end and a cotter key 105 extending through its other end to hold the pins 95 against the longitudinal movement relative to the caliper 53.

A pair of longitudinally spaced sleeves 107, 109 is closely slidably disposed on each of the pins 95 and each pair of sleeves has their adjacent ends connected by a flexible boot 111. The sleeves 107 of each pair extend through an opening 113 in the torque arm 47 aligned with a set of openings 97, 99 in the caliper leg 57 and projections 101, respectively. The sleeves 107 are fixed to the torque arm 47, for example, by welding, and each is received in a slot 115 formed in each of a pair of projecting ears 117 on the backing plate 75 to support the brake shoe 73 during assembly and disassembly.

The sleeves 109 of each pair extend through a respective one of the openings 97 in the caliper leg 57 and each sleeve 109 is fixed to the caliper leg 57, for example, by being pressed into these openings. A projecting ear 119 on each side of the backing plate 81 has a slot 121 therein similar to the slots 115 receiving a respective one of the sleeves 109 (FIG. 3) so that the pins 95 and sleeves 107, 109 also support the brake shoe 73 during assembly and disassembly.

During brake application, torque on the brake shoe 73 is taken directly by the torque arm 47 since the backing plate 75 directly engages the torque arm flanges 55, 57 as described above. Torque on the brake shoe 79 is taken by the caliper leg 57 through the backing plate flanges 88, 90. Since the sleeves 107, 109 are closely slidable on the pins 95 and are fixed to the torque arm 47 and a caliper leg 57, respectively, torque on the brake shoe 79 is effectively transferred to the torque arm 47. Thus, all the torque on the brake shoes 73, 79 is reacted at the torque arm 47.

The sleeves 107, 109 and pins 95 provide an elongated bearing surface area which effectively transfers torque from the caliper 53 to the torque spider 39. In addition, the sleeves 107, 109 reinforce the pins 95 and together they maintain the caliper 53 properly oriented relative to the rotor 31. This helps insure long brake shoe life by promoting even wear of the brake linings 77, 85.

In addition, the novel, variable length sleeve construction which includes the sleeves 107, 109 and the boots 111 is particularly advantageous in that it prevents the sliding joint between the sleeves 107, 109 and the pins 95 from being contaminated by deposits of heat, grease, salt, moisture, ice or other foreign matter. This is important in that it helps prevent reduced operation efficiency and provides smooth and consistent braking characteristics.

By the foregoing, there has been disclosed an improved disk brake calculated to fulfill the inventive objects set forth above, and while a preferred embodiment of the present invention has been illustrated and described in detail above, various additions, substitutions, modifications and omissions may be made thereto without departing from the spirit of the invention as encompassed by the appended claims.

What is claimed is:

1. A disk brake comprising a stationary torque member, a caliper housing having spaced legs lying on opposite sides of a rotor that is rotatable about a central axis, first and second brake shoes associated with the respective of said legs, actuating means for moving said brake shoes into frictional engagement with the rotor, means for transmitting braking torque from at least one of said shoes to said caliper housing, and means for transmitting at least a portion of the braking torque from said caliper housing to said torque member and for slidably supporting said caliper housing upon said torque member for movement in a generally axial direction with respect to the rotor, said last named means comprising a first sleeve member affixed to said torque member adjacent one of said legs and extending toward the other of said legs, a second sleeve member affixed to said other leg of said caliper housing coaxial with and extending toward said first sleeve member, a substantially rigid pin extending through said sleeve members and a flexible seal affixed to the adjacent ends of said sleeve members and extending therebetween around the adjacent portion of said pin.

2. A disk brake as set forth in claim 1 further including means for directly transferring braking torque from the other of the brake shoes to the torque member.

3. A disk brake as set forth in claim 1 wherein the last named means comprises two pairs of sleeve members, pins and seals as described, said pins being substantially parallel to each other.

References Cited

UNITED STATES PATENTS

| | | | |
|---|---|---|---|
| 1,807,139 | 5/1931 | Volodimirov | 74—18 X |
| 2,319,231 | 5/1943 | Hawley | 188—73 |
| 3,081,843 | 3/1963 | Dotto et al. | 188—73 |

FOREIGN PATENTS

| | | |
|---|---|---|
| 565,708 | 3/1958 | Belgium. |
| 1,146,983 | 5/1957 | France. |
| 717,350 | 10/1954 | Great Britain. |
| 1,182,911 | 12/1964 | Germany. |

MILTON BUCHLER, *Primary Examiner.*

G. E. HALVOSA, *Assistant Examiner.*